(12) United States Patent
Udd

(10) Patent No.: US 9,720,679 B2
(45) Date of Patent: Aug. 1, 2017

(54) TECHNIQUES FOR CUSTOMIZING MOBILE APPLICATIONS

(71) Applicant: UPC KONSULTOINTI OY, Vaasa (FI)

(72) Inventor: Sture Udd, Vaasa (FI)

(73) Assignee: UPC KONSULTOINTI OY, Vaasa (FI)

( * ) Notice: Subject to any disclaimer, the term of this patent is extended or adjusted under 35 U.S.C. 154(b) by 0 days.

(21) Appl. No.: 14/766,944

(22) PCT Filed: Jan. 24, 2014

(86) PCT No.: PCT/FI2014/050057
§ 371 (c)(1),
(2) Date: Aug. 10, 2015

(87) PCT Pub. No.: WO2014/128344
PCT Pub. Date: Aug. 28, 2014

(65) Prior Publication Data
US 2016/0004527 A1    Jan. 7, 2016

(30) Foreign Application Priority Data

Feb. 22, 2013   (FI) ..................................... 20135168

(51) Int. Cl.
*G06F 9/44*    (2006.01)
*G06F 9/445*   (2006.01)
(Continued)

(52) U.S. Cl.
CPC ............ *G06F 8/65* (2013.01); *G06F 9/44526* (2013.01); *H04L 67/10* (2013.01); *G06F 8/36* (2013.01);
(Continued)

(58) Field of Classification Search
CPC ..................................... G06F 8/61; G06F 8/65
(Continued)

(56) References Cited

U.S. PATENT DOCUMENTS

2003/0212982 A1*  11/2003  Brooks ................ G06F 9/4448
                                                             717/100
2006/0080341 A1    4/2006  Graham
(Continued)

FOREIGN PATENT DOCUMENTS

| EP | 1 217 549 A2 | 6/2002 | |
| WO | WO 2004/040923 A1 | 5/2004 | |
| WO | WO 2004040923 A1 * | 5/2004 | ............... G06F 8/62 |

OTHER PUBLICATIONS

Coppola et al., "The Context-Aware Browser", Intelligent Systems, IEEE, Jan./Feb. 2010, vol. 25, No. 1, pp. 38-47.
(Continued)

*Primary Examiner* — Li B Zhen
*Assistant Examiner* — Bradford Wheaton
(74) *Attorney, Agent, or Firm* — Birch, Stewart, Kolasch & Birch, LLP

(57) ABSTRACT

A mobile data processing device (MT), including a memory, a processing system and a detector system for detecting environmental identifier(s) from the environment. The memory includes at least one application, which defines a set of functions, and one or more plugins. At least one plugin is currently active. The currently active plugin defines operations of the mobile data processing device during execution of the application. The operations defined by the currently active plugin include one or more tasks. At least one task defines a subset of the functions defined by the application, including at least one function for operating the detector system. The plugin further defines an order of execution for the subset of functions. The device enables customized (Continued)

functionality in applications that must be submitted to compliance checking by platform providers.

14 Claims, 5 Drawing Sheets

(51) Int. Cl.
  *H04L 29/08* (2006.01)
  *H04W 4/00* (2009.01)
(52) U.S. Cl.
  CPC .............. *G06F 8/61* (2013.01); *G06F 9/4443* (2013.01); *H04W 4/001* (2013.01)
(58) Field of Classification Search
  USPC ........................................................ 717/172
  See application file for complete search history.

(56) References Cited

U.S. PATENT DOCUMENTS

| | | | | |
|---|---|---|---|---|
| 2007/0245356 | A1* | 10/2007 | Ari | ........................... H04L 41/20 719/319 |
| 2010/0293080 | A1 | 11/2010 | Shah | |
| 2011/0071651 | A1* | 3/2011 | Law | ................... G05B 19/0426 700/11 |
| 2011/0320956 | A1* | 12/2011 | Singh | ................. G06Q 30/0241 715/747 |
| 2012/0311562 | A1* | 12/2012 | Wang | ..................... H04L 67/22 717/177 |
| 2015/0177733 | A1* | 6/2015 | Isaksson | .................. H04Q 9/00 700/73 |

OTHER PUBLICATIONS

Ghiani et al., "UbiCicero: A location-aware, multi-device museum guide", Interacting with Computers, New York: Elsevier Science, 2009, vol. 21, No. 4, pp. 288-303.

Shang et al., "A Mobile Guide System Framework for Museums Based on Local Location-aware Approach", Computer Science and Service System (CSSS), 2011 International Conference, IEEE, 2011, pp. 1935-1940.

Wikipedia: Jave virtual machine (archived by en.wikipedia.org on Feb. 21, 2013), Fourth paragraph of section Execution environment, pp. 1-8.

Fazio, Maria et al., An Architecture for Runtime Customization of Smart Devices, 12th IEEE International Symposium on Network Computing and Applications (NCA), Aug. 2013, pp. 157-164.

Wikipedia, Plug-in (computing) [online]. Edited Feb. 21, 2013 at 21:14 [retrieved on Jun. 8, 2015], pp. 1-5.

Redondo et al., "Enhancing Residential Gateways: OSGi Service Composition," IEEE Transactions on Consumer Electronics, vol. 53, No. 1, Feb. 2007, pp. 87-95.

* cited by examiner

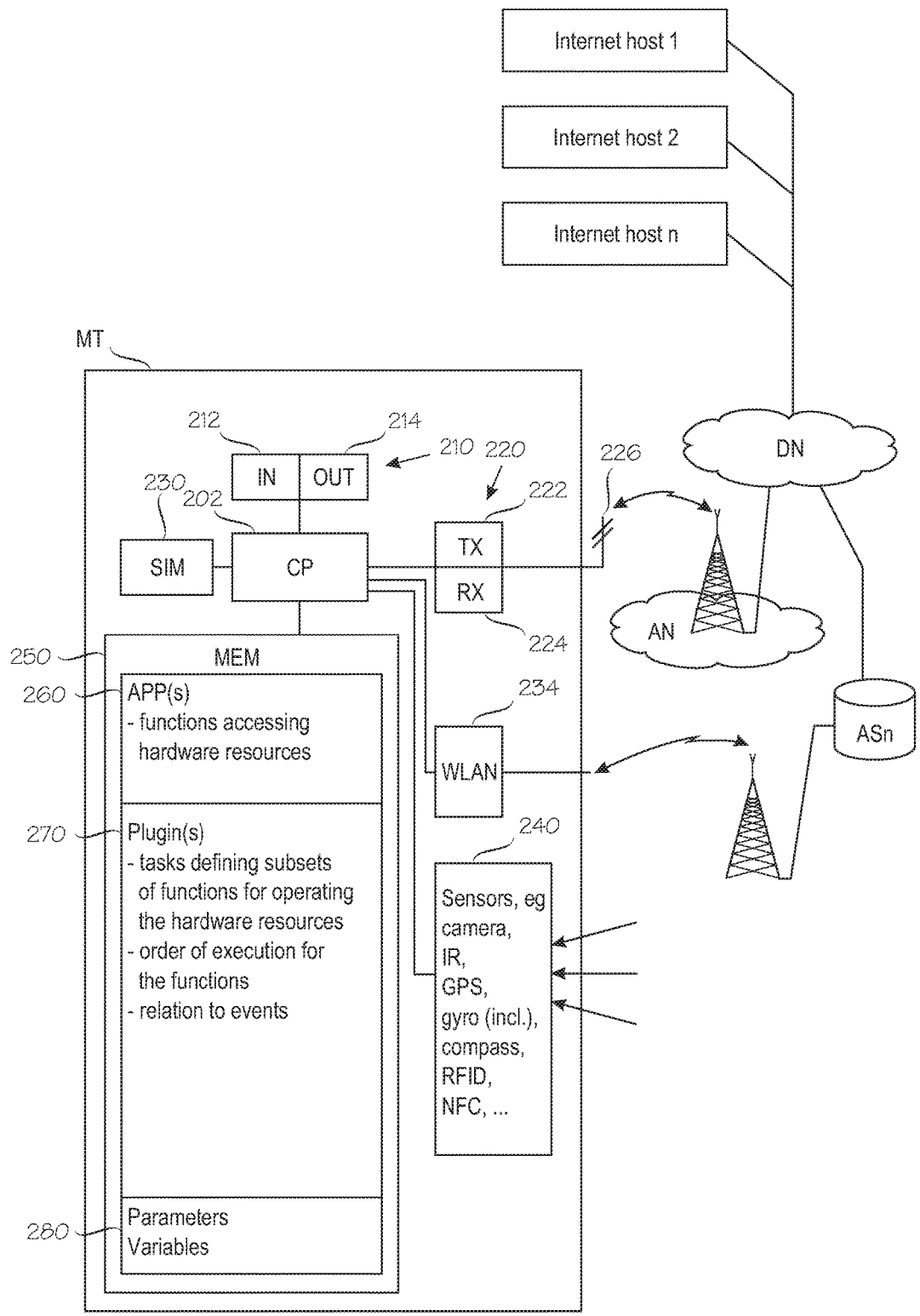

TECHNIQUES FOR CUSTOMIZING MOBILE APPLICATIONS

FIELD OF THE INVENTION

The present invention relates generally to customizing software applications whose customization is restricted by a set of boundary conditions, such as customized mobile applications for protected platforms.

BACKGROUND OF THE INVENTION

It is an increasing trend that hardware vendors tend to control delivery of mobile applications to mobile terminals. There are various reasons for that, such as a desire to collect royalties from applications sold and/or a desire to suppress software that does not meet with design guidelines, or software that comprises actual malware. It is common for mobile terminals to reject mobile applications that are not signed by the hardware vendor or an application store managed by the hardware vendor.

Applications for mobile terminals, called mobile applications in the following, are normally obtained from a repository managed by a supplier of the mobile terminal platform. For instance, Apple Inc. manages their own App Store, Amazon Appstore is a mobile application store for the Google Android operating system, Microsoft Phone Store and Microsoft Store are application stores for the Windows platform, and Nokia Store is the application store for Nokia devices. This list is non-exhaustive.

One of the problems associated with the above arrangement is that it is virtually impossible to deliver customized applications from mobile app stores. This is because each and every customized application has to be submitted for the app store for inspection and signing. Examples of applications that should be customized for individual customers include loyalty and/or membership cards, season passes for public transport and/or recreational facilities, and event passes that are available only for persons who physically attend an event.

A related problem is that the hardware vendors may require that applications delivered via their app stores are available for anyone, although payment may naturally be required. As a result, the app stores are not suitable for delivering applications which are targeted at a closed audience, such as applications for accessing sensitive information and/or applications that are in an alpha or beta test phase and not yet fit for publication.

SUMMARY OF THE INVENTION

An object of the present invention is thus to provide techniques for delivering customized applications to mobile terminals that in principle do not support customized applications. The object of the invention is attained by aspects of the invention as defined in the attached independent claims. The dependent claims and the following detailed description and drawings relate to specific embodiments which solve additional problems and/or provide additional benefits.

One of the features of the present invention is that a generic version of the mobile application is delivered from an application store, while customization information for customizing the application is delivered from a customization server. Later in this description the generic version will be called a template application. As regards overall system and network architecture, the customization server can be located similarly to the application server described in connection with FIG. 1, although the functionality of the customization server differs from the application server of FIG. 1. By delivering the template application from an application store and the customization information for customizing the application from a customization server, it is possible to overcome the restriction that application stores may only supply digitally signed applications that have passed the app store's or hardware vendor's compliance checks. A related problem is that app stores may refuse to supply mobile applications that can be programmed to perform functions that have not passed the compliance checks. This is why the template application that is to be delivered from the app store must contain some rudimentary functionality, and the functionality cannot be upgraded without any restrictions.

An aspect of the present invention is a mobile data processing device, comprising a memory system for storing program code instructions and data, plus a processing system comprising at least one processing unit. The processing system is configured to execute at least some of the program code instructions and to process the data stored in the memory system. The mobile data processing device further comprises a detector system for detecting at least one type of environmental identifier from a current environment of the mobile data processing device. The memory system comprises at least one application executable by the processing system wherein the at least one application defines a set of functions executable by the processing system.

In order to provide allow customized functionality, the memory system further comprises one or more plugins, wherein at least one of the plugins at a time is selectable as a currently active plugin for the at least one application. The at least one currently active plugin is configured to define operations of the mobile data processing device during execution of the at least one application.

The operations defined by the currently active plugin comprise one or more tasks for defining a subset of the functions defined by the at least one application, wherein the subset of functions is equal or smaller than the set of functions and wherein the subset of functions comprises at least one function for operating the detector system. Furthermore, the one or more tasks further define an order of execution for the subset of functions.

The following description uses the shorter term "mobile terminal" instead of the longer term "mobile data processing device", but it is to be noted that in some implementations or use cases the ability to act as a terminal is not mandatory.

In some implementations the tasks may further define relations between the subset of functions and one or more events detected by the currently active plugin. The events may comprise user interface events, whereby the functions can be triggered from the mobile terminal's user interface. Additionally or alternatively the events may comprise detections of real-world signals or information, whereby the functions can be triggered as a result of the mobile terminal's location, orientation, environment, ambient, current context, or the like.

In some implementations the detector system comprises at least one short-range detector. Use of short-range detector(s) facilitates determining the location of the mobile terminal.

In some implementations the detector system is only controllable via the functions of the app(s), and the plugin(s) can only invoke the functions of the app(s) via an application programming interface (API). In addition to defining which functions to use, the currently active plugin may further define a set of resources for the subset of functions. The resources may include network addresses for retrieving globally and/or locally relevant content relating to the current context of the mobile terminal's user. For example, in a zoo the globally relevant content may comprise information on the species that can be seen in the zoo. The locally relevant content may comprise information on the animals in that particular zoo. Instead of retrieving globally and/or locally relevant content from outside the mobile terminal, the plugin may include data sets or database(s) with such content. Providing the data sets or a database, or other forms of content, as part of the plugin has the benefit that a relatively complex plugin may be transferred to the mobile terminal at a location wherein efficient connections are available. For instance, on entry to a zoo, the plugin may be installed into the mobile terminal via a WLAN network available at the entrance to the zoo. Later, when the mobile terminal user explores the zoo, the plugin may detect local identifiers, such as short-range radiation or bar codes, and provide the user with content pertinent to what the user can see at their location. But when the mobile terminal user explores the zoo, continuous WLAN access is not required.

It is possible to create plugins in a platform-independent manner. In other words, the plugins are the same and communicate via the apps similarly, regardless of platform. Platform-independent plugins are possible by providing the apps with an interpreter configured to interpret incoming generic function calls to internal platform-specific function calls, whereby the one or more plugins can be implemented in a platform-independent manner. Alternatively, it is possible to create the plugins and apps for one platform and provide the apps of other platforms with an interpreter.

In some implementations, when the plugin detects one or more network addresses contained in the environmental identifiers, it is configured to direct communication from the mobile terminal to network address(es) other than those contained in the environmental identifiers. This feature can be used for several purposes. For instance, assuming that the environmental identifier is a bar code placed at an object of interest, its original purpose is to direct the viewer's mobile terminal to a fixedly programmed external server from which information on the object can be retrieved. By performing address resolution in the mobile terminal, under control of the plugin, the plugin may replace or supplement the information related to the object of interest. In some cases the plugin may direct the mobile terminal to an external server other than the one indicated in the bar code (or other environmental identifier). In other cases the plugin may retrieve information from the external server indicated in the bar code but provide additional information, such as a translation. Or, in cases where the object of interest is an advertisement, the plugin may provide the user not only with the advertisement but with impartial test results or price comparisons relating to the product being advertised. The additional or supplemental information may be retrieved from external servers and/or from a data store contained in the plugin itself.

It is typical, although not mandatory for the present invention, that the app(s) is/are digitally signed by an entity trusted by a provider of the mobile data processing device, such as a platform-specific app store, but the plugin(s) is/are not digitally signed.

In some implementations plugins of different subsets of functions may be provided to the same application. In addition to a first plugin that provides a first subset of functions for visitors, customers, or the like, there may be a second plugin that provides a second subset of functions, which is different from, and typically broader than, the first subset. The second plugin providing the second subset of functions is only offered to authorized personnel.

In a representative but non-restrictive implementation, the venue may be an exhibition, such as a museum, art gallery, trade show, shop, or any venue exhibiting objects that may be of interest to visitors. The first plugin for visitors provides information on objects in the vicinity of the visitor and instructions to public places, like cafeterias, restrooms or the like. The second plugin for authorized personnel provides additional information which may relate to passageways for personnel, security systems, persons in charge of specific functions, or the like.

In another representative but non-restrictive implementation, an app for a venue in which objects are exhibited for sale, such as shops or art galleries, the first plugin for customers shows the retail and/or campaign price of objects, while the second plugin for personnel shows additional information, such as purchase price, quantity in stock, date and quantity of next delivery, volume sold, or the like.

The second plugins for authorized personnel may, but do not have to, provide all the information provided by the first plugins. For instance, in a museum the first plugin for customers may provide detailed information and history relating to a museum exhibit, while the second plugin for security officers may show rudimentary information, such as name and description, on the actual exhibit, plus detailed information on the security systems relating to that exhibit.

BRIEF DESCRIPTION OF THE DRAWINGS

In the following section, specific embodiments of the invention will be described in greater detail in connection with illustrative but non-restrictive examples. A reference is made to the following drawings:

FIG. 2 shows a schematic block diagram of a mobile terminal;

DETAILED DESCRIPTION OF SOME SPECIFIC EMBODIMENTS

Figure 1:
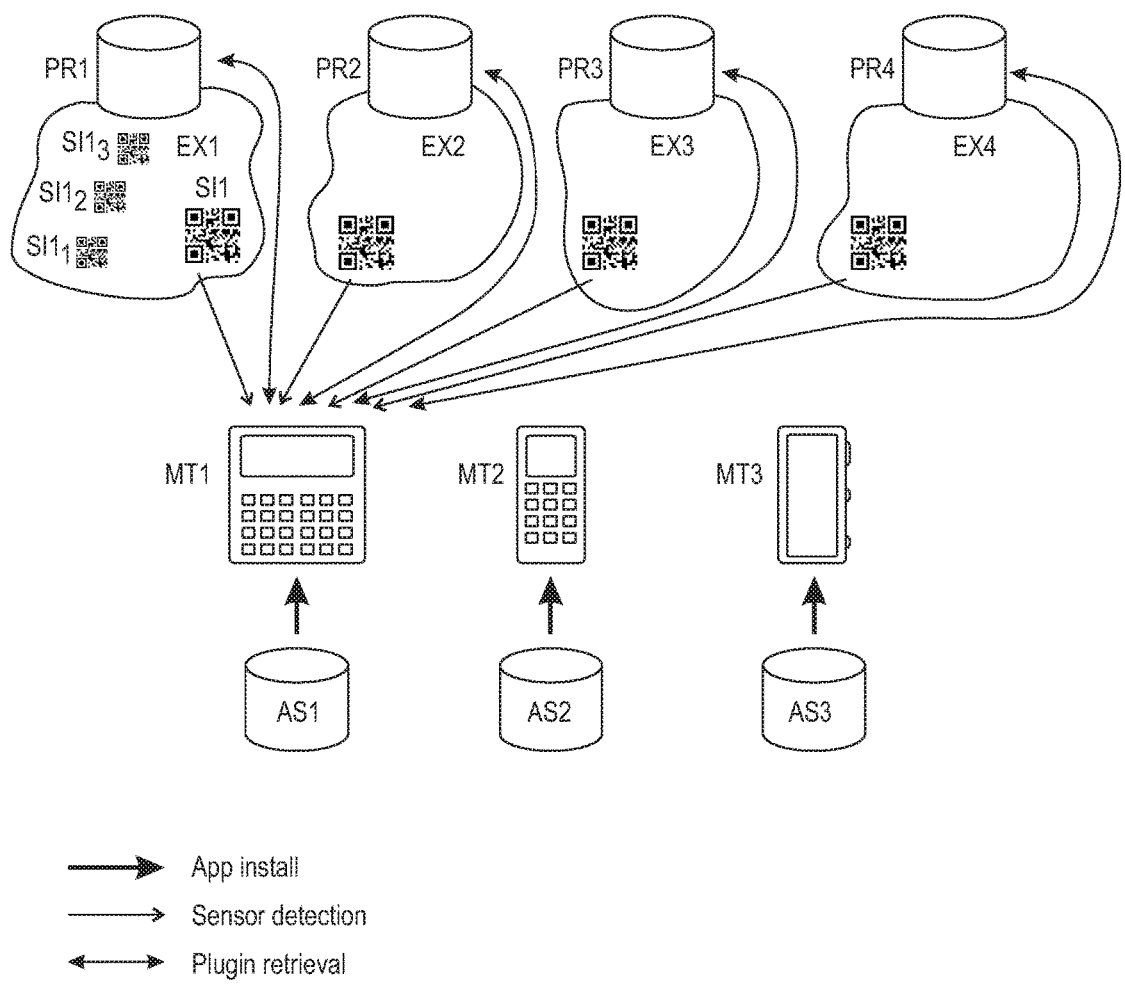
FIG. 1 illustrates a scenario in which a number of users use their respective mobile terminals to access information in various exhibitions.

FIG. 1 illustrates a scenario in which three users use their respective mobile terminals MT1, MT2 and MT3 to access information in various exhibitions EX1-EX4. In the present context, "exhibition" is used in a broad sense that encompasses any events or locations in which organizers place something for viewers to see, and the viewers are offered a chance to obtain additional information via their mobile terminals. In the present scenario, there are three users, each using a mobile terminal of a distinct platform, and four exhibitions.

In the present scenario, exhibition 1 is a museum with a relatively permanent collection. Exhibition 2 is an art gallery with a more rapidly changing displays, exhibition 3 is a zoo, while exhibition 4 may be an artistic or athletic performance. Further non-limiting examples of exhibitions are sales promotions, lectures, or the like.

A traditional way to provide users with individual descriptions of exhibitions is to provide users with audio recordings of exhibition items which are numbered consecutively. A problem with this technique is that it is inconvenient to view the exhibition items out of sequence. Another problem is that any changes to the exhibition items must be updated individually to the audio playback devices.

Another well-known technique is to provide advertisements or exhibition items with two-dimensional bar codes. Viewers can use their mobile terminals to scan the 2D bar codes. As a result the terminal's web browser is directed to a web address defined by the 2D bar code, and additional information can be obtained from the web address. This technique is applicable to providing static information to a mobile terminal. Or to express the problem more accurately, in principle it is possible for a mobile terminal to access any kind of content from a web address defined by a 2D bar code that is placed in the vicinity of an object of interest. A specific problem is that vendors or manufacturers of modern mobile terminals do not support downloading any potentially harmful content from sources other than platform-specific app(lication) stores. In addition, any apps to be provided from the app store must be comply with strict constraints and/or test defined by the platform provider. A consequence of this problem is that it is almost impossible to provide modern mobile terminals with any applications that are frequently updated. This is because any updated applications must undergo the compliance tests by the platform provider. From the point of view of the exhibition organizer, the problem is exacerbated by the necessity of repeating the updates and compliance tests for each platform provider.

According to an exemplary implementation of the present invention, the problems of the prior art techniques are alleviated by providing each mobile terminal of a distinct platform with at least one platform-specific application ("app"). The apps may be sufficiently generic for all exhibitions. In addition to the at least one app, there may be one or more plugins that are specific to certain needs or situations. The app is what instructs the mobile terminal to perform various functions. This is why the app must be submitted to compliance tests defined by the platform provider, assuming that the platform is such that compliance tests are mandatory. In contrast, the one or more plugins are not directly responsible for the functions performed by the mobile terminal and, consequently, need not be submitted to compliance tests. Instead the plugins define a subset of the functions defined by the app, an order of execution for the subset of functions, and a set of resources, such as addresses, data sets, or the like, for the subset of functions. The problem of the prior art, namely the difficulty of providing modern mobile terminals with customized, updated or situation-specific apps is alleviated because it is the generic app that defines all the functions the mobile terminal is capable of performing, and that generic app needs to be certified only once. The plugins, in contrast, merely define specific subsets of the certified functions and associated resources, which is why the plugins need not be certified separately. Because updated or situation-specific plugins need not be certified separately, it is far easier than before for exhibition organizers or the like to provide mobile terminals with updated content, even in cases where the mobile terminal only accepts apps from a vendor-specific app store.

In the scenario shown in FIG. 1, reference signs MT1-MT3 denote three mobile terminals of respective distinct platform. For each platform, there is a platform-specific application store ("app store") AS1-AS3, that provides the generic app for mobile terminals of that platform. For each of the exhibitions EX1-EX4, there is a respective set of sensory information SI1-SI4, whose detection by a mobile terminal, under control of the app, has the effect that the app instructs the mobile terminal to retrieve an exhibition-specific plugin from a plugin repository PR1-PR4. Considering the case of a visitor using the mobile terminal MT1. When the visitor encounters a number of objects of interest, such as items for display, animals, performances or the like in the exhibition EX1, those objects of interest may be provided with object-specific sets of sensory information, denoted here by $SI1_1$-$SI1_3$. When the mobile terminal MT1, under control of the app and the exhibition-specific plugin, detects a set of sensory information $SI1_1$-$SI1_3$, the plugin requests the app to cause display of further information on the user interface of the mobile terminal. Such further information is typically specific to the object of interest in the vicinity of the set of sensory information $SI1_1$-$SI1_3$.

In one specific example, the exhibition EX1 may be a museum. When the mobile terminal MT1, under control of the platform-specific app, detects the exhibition-specific set of sensory information $SI1_1$, the app instructs the mobile terminal to retrieve a plugin specific to that museum. Later, when the visitor wanders around in the museum, and the mobile terminal MT1, under control of the platform-specific app and the exhibition-specific plugin, detects object-specific sets of sensory information, denoted here by $SI1_1$-$SI1_3$ the plugin requests the app to instruct the mobile terminal to provide the user with additional information relevant to the objects of interest, such as historical items. Such additional information may comprise data, still or live images, sound, tasks for the visitor, options for accessing still further information, query forms via which users can request contact from entities related to the object of interest, or any combination of these or comparable varieties of information.

In some implementations it is possible to incorporate all exhibition-specific information into the exhibition-specific plugin, in which case the mobile terminal may remain offline after retrieving the exhibition-specific plugin. In alternative implementations detection of an object-specific set of sensory information $SI1_1$-$SI1_3$, under control of the app and the plugin, has the effect that the plugin, via the app, requests the mobile terminal to retrieve further information relevant to the object of interest.

While the use of 2D bar codes in the vicinity of objects of interest is well-known, there is an important distinction to be made regarding the way the 2D bar codes are processed in the prior art and in the present embodiment of the invention. A conventional way of using 2D bar codes in connection with mobile terminals is that the contents of the 2D bar code directs the mobile terminal's web browser to a web page defined by the 2D bar code. In the conventional technique the mobile terminal blindly follows the instructions encoded in the 2D bar code and thus relinquishes control of web navigation to the web address contained in the bar code and further links to be found on the web address. In contrast, the present invention can be implemented in such a manner that web surfing is controlled by the mobile terminal, the app that controls the mobile terminal and the plugin that defines how the app controls the mobile terminal.

In the preceding description, 2D bar codes have been used as illustrative examples of sensory information that inform the apps in the mobile terminals where to retrieve exhibition-specific plugins and what additional content to provide via the mobile terminal's user interface in response to detection of object-specific sets of sensory information. But the sensory information can take other forms instead of 2D bar codes or in addition to them. For instance, the mobile terminals may have positioning means capable of determining the mobile terminal's position, either independently or in combination with an external positioning server. The app may be configured to query a location database and determine, on the basis of the mobile terminal's position, an appropriate exhibition-specific plugin and/or the object-specific information. Positioning of the mobile terminal may be based on GPS signals, signal quality observations of communication signals and a positioning model, or the positioning may rely on weak signals that do not propagate through walls or travel long distances, such as infrared radiation or near-field or short-range wireless signals, such as Bluetooth. Alternatively, signals that do not propagate through walls or travel long distances may be used directly to indicate which plugins and/or object-specific information the app should instruct the mobile terminal to retrieve.

Preferably the platform-specific apps also perform hardware abstraction, or in other words, comprise a respective hardware-abstraction layer. This means that the plugins need not be platform-specific because the hardware-abstraction layer in the app converts the requests made by the plugin to hardware-specific instructions.

As an illustrative example, suppose that there are three different platforms, four exhibitions and the content for each exhibition is updated four times, for a total of five different versions. If each version of each content for each platform is provided in the form of a specific app, a total of 3*4*5=60 different apps is required, each of which has to be submitted for compliance tests. In contrast, the above-described implementation of the invention, wherein the plugins are platform-independent, merely requires 3 apps and 5 versions of each of the 4 situation-specific plugins, or 20 different plugins. Only the 3 apps need to be submitted for compliance tests, and each mobile terminal needs only one platform-specific app.

FIG. 2 shows a schematic block diagram of a mobile terminal. The mobile terminal MT comprises a processing system 202 with at least one central processing unit. The mobile terminal further comprises a memory system 250, which typically comprises a combination of fast volatile memory and slower non-volatile memory, as is well known to those skilled in the art. In addition, the mobile terminal MT comprises or utilizes a user interface 210, which comprises an input circuitry 212 and an output circuitry 214. The input circuitry 212 comprises the mobile terminal's microphone and user-input devices, such as a keypad and/or touch screen. The output circuitry 214 comprises the mobile terminal's display and earphone or loudspeaker. The mobile terminal MT further comprises reception/transmission circuitry 220 which comprises a transmission circuitry 222, reception circuitry 224 and antenna 226. A subscriber identity module, SIM, 230 is used by an authentication function to authenticate the mobile terminal's user and to identify the user's subscription to the access network AN. A typical modern mobile terminal also comprises WLAN (Wireless Local Area Network) circuitry 234 whose normal mode of usage is acting as a WLAN client to a WLAN base station (not shown).

In order to support installable program modules, the mobile terminal's memory 250 typically comprises routines for downloading installable program modules and for storing the installable program modules as apps (applications) 260 in the memory 250 for execution by the central processing unit CP. FIG. 2 shows an arrangement in which the mobile terminal is configured to download installable program modules from an app store ASn (n=1, 2, 3, ..., depending on the platform) via a data network DN, an access network AN, the antenna 226 and reception circuitry 224. Instead of downloading software from the app store over the access network, or in addition to it, other arrangements are equally possible, such as downloading the installable program modules via the data network DN to a separate data terminal (not shown), from which the installable program modules are transferred to the mobile terminal the WLAN circuitry 234 or via some other short-range connection, such as Bluetooth or Universal Serial Bus (USB, not shown separately). The access network AN is typically a broadband-capable mobile communication network, while the data network DN is typically the internet or some closed subnetwork implementing internet protocol (IP), commonly called intranets or extranets. At this level of generalization, all previously-discussed elements of FIG. 2 can be conventional as used in the relevant art. One or more external hosts are accessible via the access network AN and data network DN, as will be described in more detail below. Finally, reference numeral 280 denotes an area of the memory 250 used to store parameters and temporary variables.

In addition to the user interface 210, the mobile terminal typically comprises optional sensors 240 for detecting environmental variables or parameters. A non-exhaustive list of sensors 240 includes a camera, IR (infrared) detection/communication circuitry, GPS and/or other location-determination circuitry, compass, gyroscope (inclination sensor), RFID (radio frequency identification) and/or NFC (near-field communication) circuitry, or the like.

By virtue of the sensors 240, apps 260 being executed in the mobile terminal can collect information on the environment, surrounding, location and or orientation of the mobile terminal. Such sensor-based information is collectively called sensory information. The apps 260 comprises program-implemented functions which are used to operate the sensors. Depending on the app(s) being executed, the mobile terminal may be set up to collect such sensory information in response to user control, spontaneously and/or progressively, such that detection of one type of sensory information triggers the app 260 to instruct the mobile terminal to collect further information, sensory or otherwise. By way of an illustrative but non-restrictive example, a primary source of sensory information may comprise local radiation informing the mobile terminal that it is proximate to an object of potential interest, such as animals in a zoo. In response to detection of such locally constrained radiation, the app may retrieve further information relating to the object of interest, such as the animals. Such further information may comprise globally relevant information, such as a description of the animal species, and/or the further information may comprise locally relevant information, such as a description of the individual animals and their placement in the zoo. Detection of the locally constrained radiation, such as infrared, Bluetooth or near-field communication may trigger the app to collect orientation-related sensory information from the sensors 240, such as a compass heading and/or gyroscope/ inclination information, and optionally, accurate GPS information. By using a combination of the mobile terminal's location, orientation and information on the placement of animals in the zoo, the app may display relevant information on the mobile terminal's display. Assuming the mobile terminals display is pointed away from an animal cage, the assumption is that the user is looking at the animal cage, and the app being executed in the mobile terminal may display what animal species are contained in that cage, their number and recent progress in the zoo, including the number of adults and juveniles.

The above description of the exemplary app being executed by the mobile terminal in a zoo is incomplete, however. In the real world, generation of apps like this is hardly possible because of the real-world constraint that all apps must be approved by the app store or platform provider. Assuming that the zoo-specific app performs all the functions described so far, that app should be created for each zoo (or exhibition, or the like). In addition the app should be regularly updated to reflect changing conditions at the zoo. Several versions of the app should be created for different platforms, terminal configurations or the like. All the apps for all platforms, terminal configurations, zoos and changed conditions should be approved by the app store, which is clearly impractical. This residual problem is solved by cooperation of app(s) and plugin(s), as specified in this document.

Figure 3A:
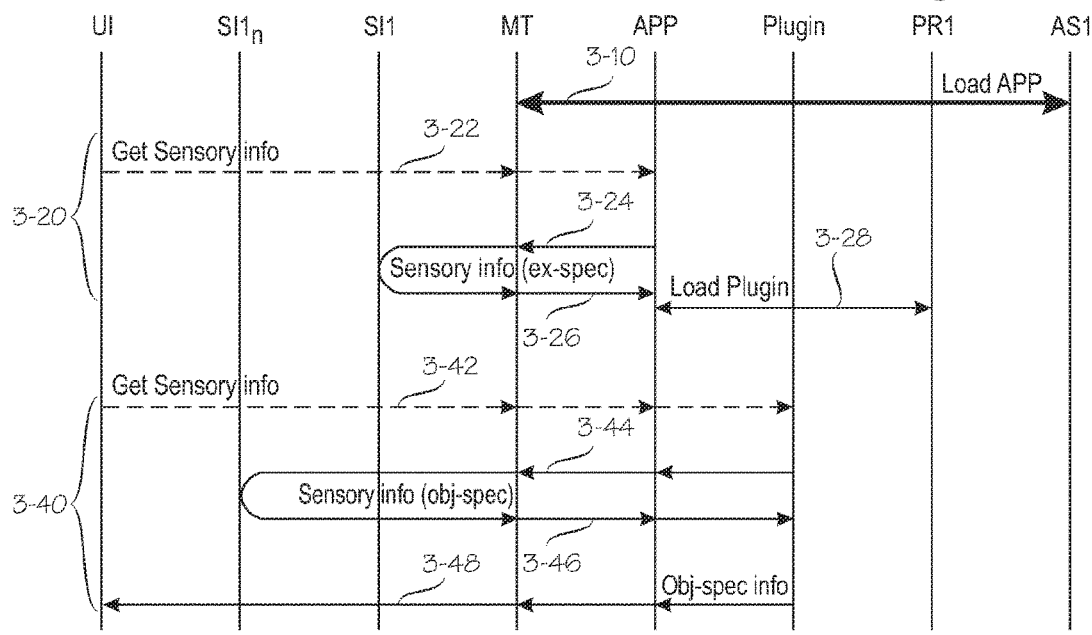
FIG. 3A is an illustrative signaling diagram of a hypothetical use case wherein a mobile terminal according an embodiment of the invention is utilized in an exhibition.

FIG. 3A is an illustrative signaling diagram of a hypothetical use case wherein a mobile terminal MT according an embodiment of the invention is utilized in an exhibition, zoo or the like. Step 3-10 comprises downloading an installing an app from a platform-specific app store AS1. This step can be performed similarly to the prior art. In steps which are not displayed explicitly, the app can be started by an explicit user action, such as activating an icon or tile of the app on the mobile terminal's display. Alternatively the app can be configured to be started in response to some other type of user action, such as taking a picture.

Reference number 3-20 denotes a series of steps to be performed once for each exhibition-specific plugin. In the example described herein, the series of steps begins at step 3-22 wherein the mobile terminal's user interface receives a user command to get sensory information. In one example, the user command to get sensory information may comprise an instruction to take a photograph and extract the contents of a bar code from the resulting photograph. Such acts are denoted by reference numbers 3-24 and 3-26, in which the app instructs the mobile terminal to capture sensory information SI1 and return the sensory information to the app.

Alternatively the command to get sensory information may comprise an instruction to determine the mobile terminal's position, or to detect some position-dependent signal, such as an infrared signal, a Bluetooth signal or WLAN signal, to name a few representative examples. In a yet further implementation, an explicit step 3-22 may be superfluous, and the app may be configured to detect appropriate sensory information spontaneously. For instance, the app may be configured to detect the presence of a WLAN network and use the name of the WLAN network as a general information on the mobile terminal's position.

Regardless of how the app received the sensory information SI1, or what kind of information it is, the app uses the sensory information SI1 to load a corresponding plugin from the plugin repository PR1 in step 3-28. In a step which is not shown explicitly, the plugin is started immediately, or it may be configured to start in response to detection of a user action or detection of some external sensory information.

This completes the series of steps 3-20, which are performed once for each plugin. In an illustrative but non-restrictive example, the series of steps 3-20 are performed once for each exhibition.

Reference number 3-40 denotes a series of steps to be performed once for each object of interest. In the example described herein, the series of steps begins at step 3-42 wherein the mobile terminal's user interface receives a user command to get sensory information. That user command is conveyed via the app to the plugin. Steps 3-42 through 3-46 are analogous with the steps 3-22 through 3-26, apart from the fact that steps 3-42 through 3-46 are controlled by the plugin via the app. What this means is that while the plugin is active and the mobile terminal MT is able to retrieve or receive content or information relevant to the plugin, steps 3-44 and 3-46 contain an instruction from the plugin, via the app, to the mobile terminal to get object-specific sensory information. That information is denoted here by $SI1_n$, wherein "1" corresponds to the exhibition the mobile station is in and "n" corresponds to the object of interest. In response to reception or detection of the object-specific sensory information $SI1_n$, the plugin, via the app, instructs the mobile terminal to produce object-specific content or information on its user interface.

Figure 3B:
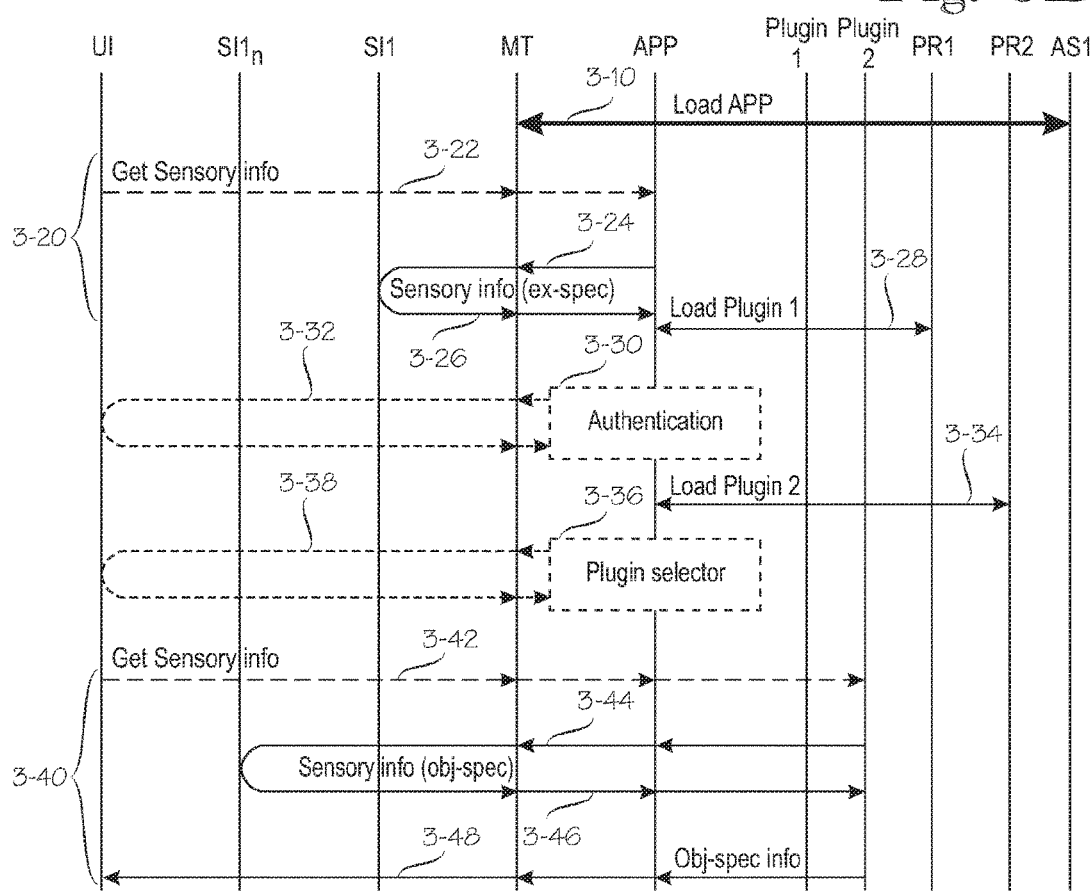
FIG. 3B is a version of the signaling diagram of FIG. 3A, adapted for a case wherein multiple plugins with different subsets of functions are provided for the same app.

FIG. 3B is a version of the signaling diagram of FIG. 3A, adapted for a case wherein multiple plugins with different subsets of functions are provided for the same app. The difference to FIG. 3A is that FIG. 3B shows two plugin repositories PR1 and PR2, from which two plugins, Plugin 1 and Plugin 2, respectively, are loaded into the mobile terminal MT. In a simple implementation both plugins may be loaded from the same repository, but providing the two (or more) plugins from multiple repositories offers additional implementation choices, as will be described later.

Steps 3-10 through 3-28 are similar to the corresponding steps in FIG. 3A, and a duplicate description is omitted. In the scenario shown in FIG. 3B, the application APP is aware of the fact that a second plugin, Plugin 2, is available for download from plugin repository PR2. In some implementations that APP may be hard-coded to know that PR2 offers Plugin 2 with a subset of functions different from Plugin 1. In other implementations Plugin 1 may inform the APP that Plugin 2, is available for download from plugin repository PR2. In yet further implementations, the APP may query known repositories for available plugins.

In the implementation shown in FIG. 3B, the APP may perform an optional authentication step 3-30 to authenticate the user of the mobile terminal MT with respect to the user's rights to download Plugin 2. In a typical but non-restrictive example, the authentication step 3-30 comprises a prompt and query 3-32 to the mobile terminal's user interface UI, by which the user can provide their credentials. In other implementations the query 3-32 to the user interface UI is not necessary, and the mobile terminal MT may store a pre-loaded certificate (not shown) that provides the user's credentials. Provided that the authentication step 3-30 is completed successfully, the APP proceeds to download Plugin 2 from plugin repository PR2 in step 3-34. For the sake of completeness, it should be noted that the authentication step 3-30 need not precede downloading the Plugin 2. Instead the authentication step 3-30 may be performed after downloading Plugin 2 but prior to its execution.

Now the APP detects that it has two (or more) plugins installed for it, Reference number 3-36 denotes a plugin selector, which is an optional software routine by which the user is requested to select, via a user interface query 3-38, which is the currently active plugin for the APP. The plugin selector 3-36 is but one of several possible implementations. As an alternative to a selection by user, the plugins may be ranked hierarchically, in such a manner that of the plugins relating to the same APP, the plugin with the highest ranking is automatically selected. As a yet further alternative, the second plugin, Plugin 2, may be coded in such a manner that it provides additional user interface elements, and event and task handlers (see FIG. 4) over the first plugin, and the APP shows a combination of the user interface elements of all installed plugins for the APP.

In the present scenario, the user selects Plugin 2 as the currently active plugin. Accordingly, the remaining steps 3-42 through 3-48 are similar to those shown in FIG. 3A but they are processed by Plugin 2, in cooperation with the APP, and a duplicate description of steps 3-42 through 3-48 is omitted.

Figure 4:
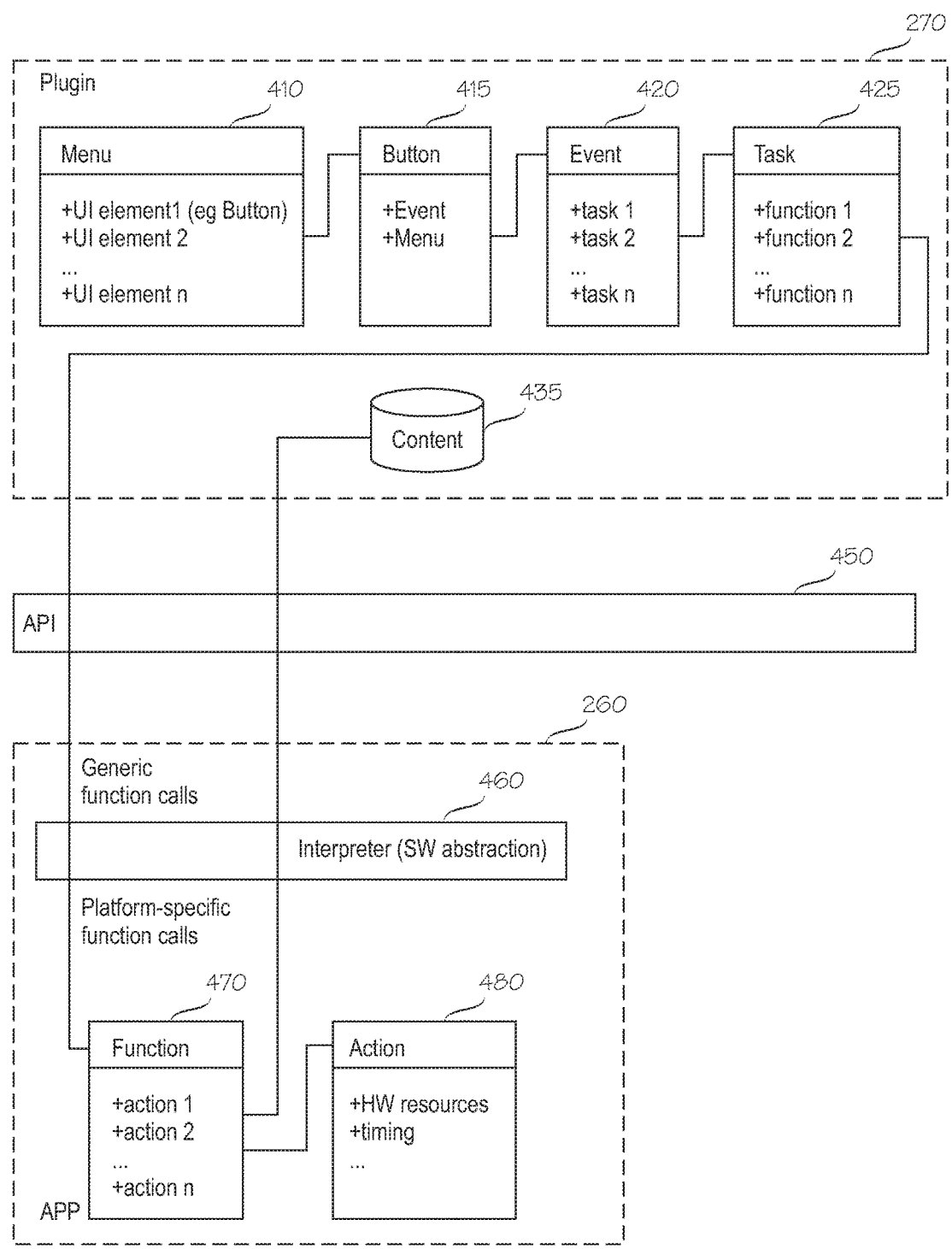
FIG. 4 illustrates an exemplary software architecture which can be used to implement embodiments of the present invention.

FIG. 4 illustrates an exemplary software architecture which can be used to implement embodiments of the present invention. Those skilled in the art will realize that the software architecture shown in FIG. 4 is not a complete one. Instead FIG. 4 illustrates those aspects of a software architecture that are relevant for solving the problems underlying the invention, most notably the problem of how to provide customized application functionality on a platform that imposes strict boundary conditions on applications.

In the example shown in FIG. 4, reference number 260 denotes an app(lication) and reference number 270 denotes a plugin. For an initial description of the software architecture shown in FIG. 4, we can ignore the interpreter/software abstraction layer 460. The app 260 contains definitions for one or more functions, one of which is denoted by reference number 470. For the purposes of understanding the software architecture, a difference between a task and a function is such that a task defines what needs to be done, such as "take a picture", or "search the picture for a 2D bar code", while a function is a software construct, of which one or more are needed to carry out each task. Some or all of function definition 470 reference action definitions 480, which cause physical action on the mobile terminal.

The plugin 270, in turn contains definitions for several tasks, one of which is denoted by reference number 425. Each task definition 425 contains a definition for an ordered set of the functions 470 contained in and provided by the app 260. For instance, an illustrative example of a task 425 is "PrepareCamera". The "PrepareCamera" task 425 may call functions 470, such as "PoweronCamera", "MeasureExposure", "AdjustShutterspeed", "AdjustAperture", "ShowPreview". Another example of a task may be "TakePicture". The "TakePicture" task may be invoked by a detection of an activation of a user interface element for this purpose, and once invoked, the "TakePicture" task may call functions like "CloseAperture", "OpenShutter", "CloseShutter" and "ReadSensorToBuffer". The function definitions 470 refer one or more actions 480. For instance the "OpenShutter" and "CloseShutter" function definitions may reference actions like "Load value 255/0 to port 123", wherein in this particular mobile terminal type, "123" is the hardware port of the shutter, while "255" and "0" are, respectively, the values for opening and closing the shutter.

The app 260 provides an application programming interface (API) 450 to the plugins, one of which is denoted by reference number 270. The particular plugin shown here as an illustrative example, has one or more menus 410. Each menu definition contains definitions for a number of user interface elements, such as static text elements or buttons 415. Each button definition 415 may be linked to further user interface elements, such as further menus or events 420. For the purposes of the present invention, the most interesting user interface elements are the events which cause something to happen. Each event definition 420 references a number of tasks 425 via the API 450. An illustrative example of an event 420 is detection of user activation of a "Take Picture" button, which itself is an illustrative example of a button 415.

For the purposes of the present invention, the most interesting aspect of the software architecture shown here is the fact that all activity on actual physical resources of the mobile terminal is controlled by the actions 480, which reside in the app 260. The app 260 undergoes compliance checks, integrity checks, authenticity checks, or the like, as required by the app store or platform provider. From the point of view of the compliance checks or the like, the plugin 270 does not define any activity on the hardware resources. Instead the plugin 270 merely defines a subset of the tasks 425 of the app 260 that may be invoked as a result of the various events 420. This is why the plugin 270 need not be submitted to the compliance checks imposed by the app store, although the plugin 270 provides the mobile terminal with customized functionality. Specifically, each customized plugin 270 may define relations between user interface elements 415 and events 420 to the tasks 425. The tasks 425 invoke functions 470 and actions 480 via the API 450. But a plugin may not define new functions or actions and, therefore, need not be submitted for approval by the app store.

Because the plugin(s) need not be submitted for approval by the app store, it is theoretically possible to create them in a platform-independent manner. Of course, there is the technical obstacle that platform-specific apps contain platform-specific functions, which require platform-specific function calls. This residual problem can be solved by providing the app(s) 260 with an interpreter 460, which acts as a software abstraction layer. The interpreter 460 receives non-native function calls and converts them to native, or platform-specific, function calls. In one implementation one platform may be given a default platform status, and on that platform the interpreter 460 is superfluous. Platform-independent software creation is easier, however, by adopting the implementation shown in FIG. 4, wherein on all platforms the plugins request service from the Apps by means of generic (platform-independent) function calls, which the interpreter converts to function calls specific to that platform. Those skilled in the art will realize that for several functions a simple change of function name or a change in the order of parameters is insufficient, and the interpreter 460 may have to combine multiple functions of some platforms to accomplish something for which another platform needs just one function. In the reverse direction the interpreter 460 converts generic results to platform-specific result formats.

According to another optional feature, the plugins 270 may comprise not only definitions for execution logic but content, as exemplified by a data store symbol 435.

It is well known in the prior art that when a user points a mobile terminal's camera at a 2D bar code and captures it with a scanning application, that scanning application will direct the mobile terminal's browser to an external server for retrieving content referenced by the 2D bar code. According to optional features of the present description, such retrieval of content referenced by sensory information captured by the mobile terminal can be enhanced in several aspects. Firstly, the sensory information that references external content is not restricted to bar codes. Instead, any sensory information received or captured by the mobile terminal can be used to reference external content, such as infrared signaling, radio or microwave signaling, image recognition with respect to features other than bar codes, and so on. Secondly, content referenced by the received or captured sensory information is not necessarily retrieved from a fixedly programmed server (a uniform resource locator, URL, fixedly programmed in the bar code, for example). Instead, such content may be retrieved from sources that are not directly indicated by the bar code. In some implementations, content referenced by sensory information may be retrieved from the data store 435 contained in the plugin 270. In some implementations, content referenced by sensory information may be retrieved from one or more external (online) servers, other than those directly indicated by the URL encoded in the sensory information. Yet further, in some implementations the choice as to whether content shall be retrieved from external server(s) or internal sources 435 is based on user input received from the mobile terminal's user input.

Some or all of the above-described features can be used in combination. For instance, it is well known that objects in exhibitions may be provided with bar codes that direct a mobile terminal's browser to URL addresses encoded in the bar codes. Optional features of the present description can be used to enhance behavior of mobile terminals. For instance, it is possible to provide a plugin 270 that is specific to an exhibition, wherein the plugin 270 contains an internal guidebook within the content data store 435. When the mobile terminal captures a bar code or receives some other kind of information indicating the user's presence in the vicinity of an object, the plugin can intercept the URL (or other information) and retrieve content from the internal data store 435 and/or from a server other than the one that is fixedly programmed to the bar code.

In another example the sensory information is a bar code specifying an invoice to be paid. Data security and privacy may be enhanced by implementing a further optional feature in which the plugin, in a pseudo-random manner, selects one of multiple alternative communication channels for communicating with the user's bank. The multiple alternative communication channels may comprise alternative technologies, such as cellular connections, WLAN connections, or the like. Alternatively or additionally the multiple alternative communication channels may comprise network addresses of the bank's server(s). For instance, assume that the plugin (provided by the bank) and the bank's server system share a secret algorithm by which a communication resource, such as server address, is varied from a question to the answer, an intruder cannot validly send the answer to the server address from which the question was sent. Other reasons for changing the server address from the one fixedly programmed in the bar code may be that the primary server is out of service or overloaded.

In the simplified diagram shown in FIG. 4, the events 420 are shown as user interface events. In other words, FIG. 4 shows events as coupled to user interface elements 415. In some plugins some or all of events 420 may be events other than user interface events. In other words, some or all of the tasks 425 may be triggered by events other than user interface events. For instance, detection of a locally constrained radiation (eg infrared, Bluetooth, NFC, or the like) is an event which may spontaneously, that is, without requiring any user interface activity, be interpreted as an event that invokes further functions 470 via the API 450. In one example, detection of the mobile terminal's location and/or detection of locally constrained radiation may invoke a task 425 that contains an ordered list of functions 470 to be executed. A task 425 invoked in response to detection of the mobile terminal's location or proximity to an object of interest may define functions for obtaining globally or locally relevant content relating to the object of interest. The task 425 may further define functions for determining the mobile terminal's orientation. That way the app 260, as customized by the currently active plugin 270, may determine which particular object the mobile terminal user is looking at, under the assumption that the user is looking in a direction with a known relation to the orientation of the mobile terminal. An intuitive direction for viewing is the orientation of the mobile terminal's camera.

In one further illustrative example, the mobile terminal user visits a zoo. On entry to the zoo, detection of local sensory information, such as capturing a bar code with the mobile terminal's camera or detection of local radiation, triggers the app to retrieve a zoo-specific plugin from a plugin repository. While the zoo-specific plugin is the active plugin, it customizes the operations of the app. On sensing the mobile terminal's location (eg via GPS or local sensory information), which is an example of an event 420, the plugin may invoke a task 425 that requests the app 260 to invoke functions 470 for retrieving content relevant to animals in the user's vicinity. Such locally relevant content may be retrieved from a local repository, or it may be included in the plugin, for example in the form of a database. The plugin may determine, or request the app to determine, that the animal cage in the direction of the mobile terminal's camera contains animals X, Y and Z. The plugin may further invoke a function to activate the mobile terminal's camera. One example of a user interface event may be detection of touch input on a touch-sensitive display. Now, detection of touch input on the display may invoke a task for comparing the area at the touch input with pictures of the animals X, Y and Z, which are the animals the camera is capable of seeing. If the area at the touch input correlates with a pictures of one of the animals X, Y and Z, the plugin may display content relevant to the animal the user pointed to on the display. In this example the locally relevant information indicated that the animal cage in the camera's field of vision contained animals X, Y and Z, and this made the task of identifying the user-selected animal much simpler compared with a task of identifying the animal without the assumption that it was one of X, Y and Z. This is only one example of using tasks as ordered sets of functions to be requested from the app via the API. In this example the ordered sets of functions comprise determining the mobile terminal's location and orientation, and based on the location and orientation, retrieving global and local content that is relevant in that location and orientation. Those skilled in the art will realize that wide a variety of other examples are possible.

The foregoing description focuses on the distribution of responsibilities between apps 260 and plugins 270. A very brief crystallization is that the app 260 determines what kind of sensory information the mobile terminal is capable of obtaining and processing, and how the mobile terminal obtains the sensory information. The plugins 270, in turn, specify which functions of the mobile terminal will be used to collect and process the sensory information, and how the functions may be joined to sequences that are relevant in the user's current context. By virtue of an appropriate distribution of responsibilities between apps and plugins, the present invention solves the problem of the prior art, wherein provisioning of customized content typically requires approval of a large number of apps by the app store.

In addition to the foregoing distribution of responsibilities between apps and plugins, further tasks may be assigned to the plugins. For instance, the apps 260 may provide a default set of user interface elements, such as background image, menus, buttons, selection boxes or the like. These default user interface elements are used unless a plugin overrides them by providing context-specific user interface elements. For example, in connection with FIG. 2, a use case was described wherein detection of locally constrained radiation causes the mobile terminal to collect sensory information, such as location and orientation, and display relevant information depending on which direction the user point the mobile terminal to. In some implementations, the app 260 may cooperate with a specific plugin 270 that overrides some or all of the user interface elements. For instance, in a department store the default user interface elements may be replaced by brand-specific UI elements of the department store.

In some implementations, the plugin(s) are configured to perform independent decision regarding linking, ie, directing communications from the mobile terminal to network addresses or resources. For example, the currently active plugin may detect sensory information, such as a bar code or electromagnetic radiation that contains a network address (URL). Instead of directing the mobile terminal to the detected URL, the plugin requests the app to direct communications from the mobile terminal another network address, which in some implementations mentations may depend on additional considerations, like the mobile terminal's location, terminal type or platform, identity or group of the terminal's subscriber, or the like. Some detailed examples will be provided in connection with FIGS. 5 and 6.

As stated in connection with FIG. 3B, it is possible to provide multiple plugins with different subsets of functions for a single application APP. An implementation with multiple plugins for the same APP causes some changes in the software architecture of FIG. 4. For instance, there are multiple plugins 270. There may be plugin selector (shown as item 3-36 in FIG. 3B) that selects one of the multiple plugins as the currently active plugin. Alternatively, the APP may show all the user interface elements 410 of all plugins on the user interface. If the user interface element selected by the user is only provided by one plugin, the event handler of that plugin is used. On the other hand, if the user interface element selected by the user is only provided by multiple plugins, the event handler of the highest-ranking plugin providing that user interface element will be used. For instance, if a similarly named user interface element is provided by a visitor plugin and a security officer plugin, the event handler of the security officer plugin will be used to process the user interface element.

Figure 5:
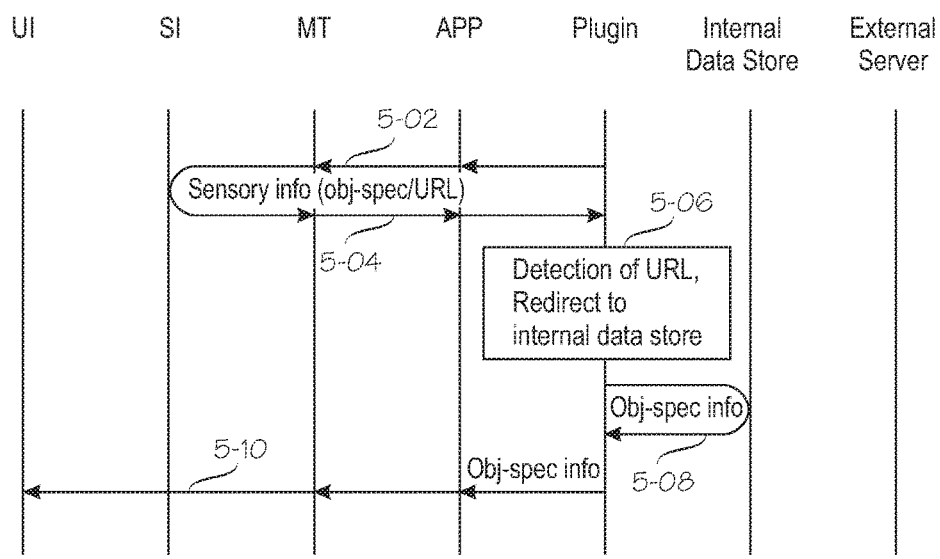
FIG. 5 is a signaling diagram illustrating an implementation in which the currently active plugin detects a network address in a sensory information and provides alternative or supplemental information to the user.

FIG. 5 is a signaling diagram illustrating an implementation in which the currently active plugin detects a network address (URL) in a sensory information, such as a barcode or locally constrained radiation, and provides alternative or supplemental information to the user. Step 5-02 is a function call to an app to capture sensory information, which is returned to the plugin in step 5-04. The sensory information relates to an object of interest and contains an identifier, such as a network address (URL), from which information relating to the object of interest can normally be retrieved. The URL is an example of environmental identifier, ie, an identifier captured from the mobile terminal's environment. In step 5-06 the plugin detects the URL in the sensory information. In step 5-08, instead of directing the mobile terminal to the URL fixedly programmed in the environmental identifier, the plugin retrieves information specific to the object of interest from an internal data store via an appropriate function call to the app (cf. item 435 in FIG. 4). In step 5-10 the plugin delivers the object specific information retrieved from the internal data store to the user interface.

Figure 6:
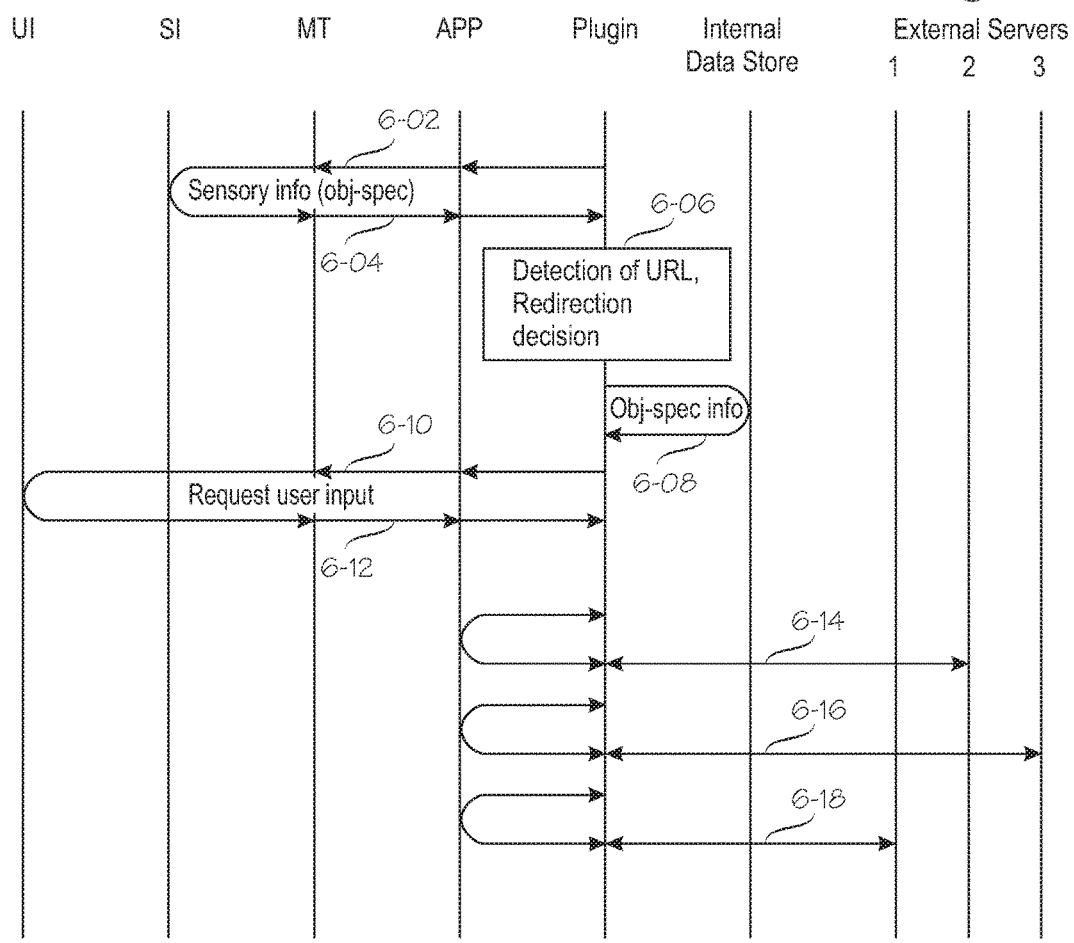
FIG. 6 is a signaling diagram illustrating another implementation in which the currently active plugin makes independent decisions regarding linking to external network resources.

FIG. 6 is a signaling diagram illustrating another implementation in which the currently active plugin makes independent decisions regarding linking to external network resources. The example shown in Figure begins similarly to FIG. 5, in the sense that the plugin detects a network address (URL) in a sensory information captured by the mobile terminal, steps 6-02 through 6-06. For instance, the plugin may detect the URL of a bank's server by scanning an invoice. Alternatively, the plugin may obtain the URL via the mobile terminal's user inters face, or from any of a number of sources. Again, the plugin may retrieve some object-specified information from the internal data store in step 6-08. In steps 6-10 and 6-12 the plugin requests and received user input from the user interface. Normally the mobile terminal should now communicate the user input, or decisions based on the user input, to an external server, such as the bank's server. In the present implementation the plugin, which may be provided by the bank, utilizes several alternative communication resources, denoted as external servers 1, 2 and 3, in a pseudo-random fashion, as shown in steps 6-14 through 6-18. The several alternative communication resources may comprise different network addresses (URL), or indeed, alternative communication technologies, such as text messaging, data call, e-mail, http(s), WLAN, or whatever communication technologies are available to the mobile terminal. Use of the several alternative communication resources in a pseudo-random fashion enhances data security and privacy. For instance, the bank may request, via one of the alternative communication resources, the user to confirm a transaction. In the present case the bank and the plugin have negotiated between themselves an order in which the alternative communication resources are used, and an intruder or eavesdropper does not know the communication resource from which the bank expects to receive the user's confirmation.

Those skilled in the art will realize that the inventive principle may be modified in various ways without departing from the spirit and scope of the present invention.

The invention claimed is:

1. A mobile data processing device, comprising:
a memory system for storing program code instructions and data;
a processing system comprising at least one processing unit, wherein the processing system is configured to execute at least some of the program code instructions and to process the data stored in the memory system; and
a detector system for detecting at least one type of environmental identifier from a current environment of the mobile data processing device,
wherein:
the memory system comprises at least one application executable by the processing system wherein the at least one application contains a set of functions executable by the processing system;
the memory system further comprises one or more plugins, wherein the at least one application and the one or more plugins are installable separately from each other, and wherein at least one of the one or more plugins at a time is selectable as a currently active plugin for the at least one application;

if a user interface element selected by the user corresponds to multiple plugin, the highest ranking plugin is selected to be at least the currently active plugin; and
the at least one currently active plugin does not comprise executable functions but is configured to define operations of the mobile data processing device during execution of the at least one application, wherein the operations defined by the currently active plugin comprise one or more tasks,
wherein at least one of the tasks:
is configured to call a subset of the functions contained in the at least one application, wherein the subset of functions is equal or smaller than the set of functions and wherein the subset of functions comprises at least one function for operating the detector system; and
defines an order of execution for the subset of functions.

2. The mobile data processing device according to claim 1, wherein said at least one of the one or more tasks defines relations between the subset of functions and one or more events detected by the currently active plugin.

3. The mobile data processing device according to claim 1, wherein the detector system comprises at least one short-range detector.

4. The mobile data processing device according to claim 1, wherein the detector system is only controllable via the functions of the at least one application.

5. The mobile data processing device according to claim 1, wherein the currently active plugin further defines a set of resources for the subset of functions.

6. The mobile data processing device according to claim 1, wherein the at least one application comprises an interpreter configured to interpret incoming generic function calls to internal platform-specific function calls, whereby the one or more plugins can be implemented in a platform-independent manner.

7. The mobile data processing device according to claim 1, wherein in response to detection of one or more network addresses contained in the environmental identifiers, the at least one of the one or more plugins is configured to direct communication from the mobile data processing device to at least one network address other than the one or more network addresses contained in the environmental identifiers.

8. The mobile data processing device according to claim 7, wherein the at least one of the one or more plugins is configured to direct communication from the mobile data processing device into an internal content storage.

9. The mobile data processing device according to claim 7, wherein the at least one of the one or more plugins is configured to direct communication from the mobile data processing device via multiple alternative routes.

10. The mobile data processing device according to claim 7, wherein the at least one of the one or more plugins is configured to perform said directing communication from the mobile data processing device to a network address that depends on the location of the mobile data processing device.

11. The mobile data processing device according to claim 1, wherein the at least one type of environmental identifier comprises one or more of a bar code, a near-field communication ["NFC"]tag, a Bluetooth tag, and infrared radiation.

12. The mobile data processing device according to claim 1, wherein the application is digitally signed by an entity trusted by a provider of the mobile data processing device, and wherein at least one plugin selectable as a currently active plugin is not digitally signed.

13. A method for operating a mobile data processing device, which comprises a memory system for storing program code instructions and data, a processing system configured to execute at least some of the program code instructions and to process the data stored in the memory system, and a detector system for detecting at least one type of environmental identifier from a current environment of the mobile data processing device, the method comprises:
installing in the memory system:
at least one application executable by the processing system wherein the at least one application defines a set of functions executable by the processing system; and
one or more plugins, wherein the at least one application and the one or more plugins are installable separately from each other, and
selecting at least one of the one or more plugins at a time as a currently active plugin for the at least one application,
wherein if a user interface element selected by the user corresponds to multiple plugin, selecting the highest ranking plugin to be at least the currently active plugin;
wherein the at least one currently active plugin does not comprise executable functions but is configured to define operations of the mobile data processing device during execution of the at least one application, wherein the operations defined by the currently active plugin comprise one or more tasks, and
executing at least one of the tasks:
calling a subset of the functions contained in the at least one application, wherein the subset of functions is equal or smaller than the set of functions and wherein the subset of functions comprises at least one function for operating the detector system; and
defining an order of execution for the subset of functions.

14. A memory system for storing program code instructions and data for a mobile data processing device, which also comprises a processing system configured to execute at least some of the program code instructions and to process the data stored in the memory system, wherein the mobile data processing device also comprises a detector system for detecting at least one type of environmental identifier from a current environment of the mobile data processing device, wherein the memory system comprises:
at least one application executable by the processing system wherein the at least one application defines a set of functions executable by the processing system; and
one or more plugins, wherein the at least one application and the one or more plugins are installable separately from each other, and wherein at least one of the one or more plugins at a time is selectable as a currently active plugin for the at least one application,
wherein if a user interface element selected by the user corresponds to multiple plugin the highest ranking plugin is selected to be at least the currently active plugin,
wherein the at least one currently active plugin does not comprise executable functions but is configured to define operations of the mobile data processing device during execution of the at least one application, wherein the operations defined by the currently active plugin comprise one or more tasks, and
wherein at least one of the tasks:
is configured to call a subset of the functions contained in the at least one application, wherein the subset of functions is equal or smaller than the set of functions and wherein the subset of functions comprises at least one function for operating the detector system; and defines an order of execution for the subset of functions.

* * * * *